US00RE43589E

(19) United States
(12) Reissued Patent
Rock et al.

(10) Patent Number: US RE43,589 E
(45) Date of Reissued Patent: Aug. 21, 2012

(54) ADVANCED ENGINEERED GARMENT

(75) Inventors: Moshe Rock, Brookline, MA (US); David Costello, Marblehead, MA (US); Jane Hunter, Manassas, VA (US); Charles Haryslak, Groveland, MA (US)

(73) Assignee: MMI-IPCO, LLC, Lawrence, MA (US)

(21) Appl. No.: 13/160,685

(22) Filed: Jun. 15, 2011

Related U.S. Patent Documents

Reissue of:
(64) Patent No.: 7,546,853
Issued: Jun. 16, 2009
Appl. No.: 11/442,786
Filed: May 30, 2006

(51) Int. Cl.
*D03D 27/00* (2006.01)
*D03D 27/02* (2006.01)
*D03D 13/00* (2006.01)
*D03D 1/00* (2006.01)
*D03D 25/00* (2006.01)

(52) U.S. Cl. ..... 139/391; 139/383 R; 139/394; 139/420 R; 139/426 R; 2/2.5; 89/36.05

(58) Field of Classification Search ... 2/2.5; 139/383 R, 139/391, 394, 420 R, 426 R
See application file for complete search history.

(56) References Cited

U.S. PATENT DOCUMENTS 3,337,875 A * 8/1967 Blakeney ..... 2/2.5
3,771,171 A * 11/1973 Mitchell ..... 2/2.5
3,855,632 A * 12/1974 Davis ..... 2/2.5
3,873,998 A * 4/1975 Norris et al. ..... 2/2.5
3,891,996 A * 7/1975 Leach et al. ..... 2/2.5
3,911,498 A 10/1975 Van Staagen
4,170,793 A 10/1979 O'Brien
4,183,097 A * 1/1980 Mellian ..... 2/2.5
4,451,934 A 6/1984 Gioello
4,485,491 A * 12/1984 Rasmussen ..... 2/2.5
4,507,802 A * 4/1985 Small ..... 2/2.5
4,541,129 A 9/1985 Murakami
4,713,895 A 12/1987 Vallières
4,810,559 A * 3/1989 Fortier et al. ..... 428/161
5,060,314 A * 10/1991 Lewis ..... 2/2.5
5,226,180 A 7/1993 Leach
5,312,667 A * 5/1994 Lumb et al. ..... 428/91

(Continued)

FOREIGN PATENT DOCUMENTS

CA 2533958 10/2006

(Continued)

OTHER PUBLICATIONS

European Search Report, EP 11 16 4211, dated Sep. 14, 2011, received from the European Patent Office (5 pages).

(Continued)

*Primary Examiner* — Bobby H Muromoto, Jr.
(74) *Attorney, Agent, or Firm* — Fish & Richardson P.C.

(57) ABSTRACT

An under body armor hybrid fabric garment has first and second fabric portions. The first fabric portion, configured to cover an upper torso region of a user's body left exposed by the body armor and extending into a second body transition region covered by the body armor, is formed of low or no stretch fabric. The second fabric element, configured to cover a lower torso region of the user's body underneath the body armor, is formed of stretchable fabric.

101 Claims, 9 Drawing Sheets

U.S. PATENT DOCUMENTS 5,325,538 A * 7/1994 Schoenweiss et al. ..... 2/2.5
5,344,698 A * 9/1994 Rock et al. ..... 442/312
5,398,340 A * 3/1995 Kibbee ..... 2/2.5
5,471,906 A * 12/1995 Bachner et al. ..... 89/36.05
5,515,541 A 5/1996 Sacks et al.
5,547,733 A * 8/1996 Rock et al. ..... 428/91
5,855,125 A * 1/1999 Lohmueller et al. ..... 66/196
6,082,147 A * 7/2000 Rock et al. ..... 66/191
6,116,059 A 9/2000 Rock et al.
6,131,198 A * 10/2000 Westrick ..... 2/102
6,131,419 A * 10/2000 Rock et al. ..... 66/194
6,164,095 A * 12/2000 Rock et al. ..... 66/194
6,182,288 B1 2/2001 Kibbee
6,196,032 B1 * 3/2001 Rock et al. ..... 66/195
6,199,410 B1 * 3/2001 Rock et al. ..... 66/195
6,246,573 B1 6/2001 Khan et al. ..... 361/683
6,257,011 B1 * 7/2001 Siman-Tov et al. ..... 62/259.3
6,276,155 B2 * 8/2001 Siman-Tov et al. ..... 62/259.3
6,295,648 B2 * 10/2001 Siman-Tov et al. ..... 2/2.5
6,363,527 B1 * 4/2002 Biermann et al. ..... 2/2.5
6,412,207 B1 7/2002 Crye et al. ..... 42/70.06
6,481,015 B1 * 11/2002 Lanier ..... 2/2.5
6,685,749 B1 * 2/2004 Rock et al. ..... 8/115.51
D487,848 S 3/2004 Crye et al. ..... D5/62
6,715,160 B2 4/2004 Crye et al. ..... 2/457
6,748,601 B2 * 6/2004 LaShoto et al. ..... 2/102
6,763,671 B1 * 7/2004 Klett et al. ..... 62/259.3
6,766,529 B1 * 7/2004 Nathan ..... 2/2.5
6,766,565 B2 7/2004 Crye et al. ..... 24/381
6,767,849 B2 * 7/2004 Rock et al. ..... 442/67
6,779,368 B2 * 8/2004 Rock et al. ..... 66/191
6,782,590 B2 * 8/2004 Rock et al. ..... 28/105
6,804,829 B2 10/2004 Crye et al. ..... 2/6.6
6,828,003 B2 * 12/2004 Rock et al. ..... 428/97
6,832,461 B2 12/2004 Crye et al. ..... 52/783.19
6,832,497 B1 * 12/2004 Rock et al. ..... 66/195
6,837,078 B1 * 1/2005 Rock et al. ..... 66/195
6,848,119 B2 2/2005 Crye et al. ..... 2/247
6,892,392 B2 5/2005 Crye et al.
6,920,646 B2 7/2005 Crye et al. ..... 2/457
6,927,182 B2 * 8/2005 Rock et al. ..... 442/312
7,043,766 B1 5/2006 Foreman et al.
7,197,772 B2 4/2007 Crye et al. ..... 2/247
7,217,456 B1 * 5/2007 Rock et al. ..... 428/379
7,237,270 B2 7/2007 Crye et al. ..... 2/24
D560,915 S 2/2008 Crye et al. ..... D5/62
D568,544 S 5/2008 Crye et al. ..... D29/100
D569,043 S 5/2008 Crye et al. ..... D29/100
D569,044 S 5/2008 Crye et al. ..... D29/100
D569,045 S 5/2008 Crye et al. ..... D29/100
D569,046 S 5/2008 Crye et al. ..... D29/100
D572,909 S 7/2008 Crye et al. ..... D5/62
D573,311 S 7/2008 Crye et al. ..... D29/100
D592,861 S 5/2009 Crye et al. ..... D5/62
7,546,853 B2 * 6/2009 Rock et al. ..... 139/391
2001/0003907 A1 * 6/2001 Siman-Tov et al. ..... 62/259.3
2001/0046580 A1 * 11/2001 Rock et al. ..... 428/92
2002/0122914 A1 * 9/2002 Rock et al. ..... 428/85
2003/0003264 A1 * 1/2003 Rock et al. ..... 428/92
2003/0070200 A1 4/2003 Crye et al. ..... 2/6.6
2003/0070211 A1 4/2003 Crye et al. ..... 2/457
2003/0074719 A1 4/2003 Crye et al. ..... 2/247
2003/0077967 A1 * 4/2003 Rock et al. ..... 442/312
2003/0101682 A1 6/2003 Crye et al. ..... 52/783.17
2003/0167548 A1 * 9/2003 LaShoto et al. ..... 2/22
2003/0167557 A1 * 9/2003 LaShoto et al. ..... 2/228
2003/0167560 A1 * 9/2003 LaShoto et al. ..... 2/463
2004/0045143 A1 * 3/2004 Rock et al. ..... 28/159
2004/0083768 A1 * 5/2004 Rock et al. ..... 66/190
2004/0132367 A1 * 7/2004 Rock ..... 442/76
2004/0226071 A1 11/2004 Crye et al. ..... 2/108
2005/0010987 A1 1/2005 Crye et al. ..... 2/2.5
2005/0053759 A1 * 3/2005 Rock et al. ..... 428/91
2005/0075028 A1 * 4/2005 Rock et al. ..... 442/318
2005/0076423 A1 4/2005 Crye et al. ..... 2/457
2005/0082330 A1 4/2005 Fehlberg et al. ..... 224/631
2005/0095940 A1 * 5/2005 Rock et al. ..... 442/304
2005/0097652 A1 * 5/2005 Rock et al. ..... 2/82
2005/0125880 A1 6/2005 Crye et al. ..... 2/251
2006/0005292 A1 1/2006 Crye et al. ..... 2/24
2006/0040059 A1 * 2/2006 Rock et al. ..... 427/288
2006/0068155 A1 * 3/2006 Rock et al. ..... 428/85
2006/0230504 A1 10/2006 Razzaghi et al.
2006/0277651 A1 12/2006 Razzaghi et al. ..... 2/81
2006/0277950 A1 * 12/2006 Rock ..... 66/169 R
2007/0000001 A1 1/2007 Tomann et al.
2008/0198579 A1 8/2008 Crye et al. ..... 362/106
2009/0083948 A1 4/2009 Crye et al. ..... 24/197
2009/0084822 A1 4/2009 Crye ..... 224/674

FOREIGN PATENT DOCUMENTS

CA 2533962 10/2006
EP 1712144 10/2006
FR 2514619 4/1983
GB 2117805 10/1983
GB 2352959 2/2001
WO 03/027600 4/2003
WO 2004/082413 9/2004
WO WO 2006/002371 1/2006
WO 2008/079525 7/2008
WO 2008/115932 9/2008

OTHER PUBLICATIONS

European Search Report in EP 07 25 2100, dated Sep. 11, 2007 (4pp.).

* cited by examiner

ADVANCED ENGINEERED GARMENT

Matter enclosed in heavy brackets [ ] appears in the original patent but forms no part of this reissue specification; matter printed in italics indicates the additions made by reissue.

TECHNICAL FIELD

This disclosure relates to garments, and, particularly, to garments worn by an individual underneath body armor.

BACKGROUND

Body armor is well known for use by persons in combat and battlefield or analogous situations for preventing ballistic projectiles from penetrating covered regions of the body of the wearer. More recently, body armor covering increased surface area of the body has been developed. For example, U.S. Pat. No. 5,060,314 to Lewis describes a ballistic resistant jacket that extends up to 3 inches below the wearer's waist, with a back panel, a combined front and left side panel, a combined front and right side panel, a collar and over-the-shoulder portions. U.S. Pat. No. 6,363,527 to Biermann et al. describes a body armor vest formed of thermally conductive fibers, for improved heat transfer, and moisture-wicking materials, to keep moisture away from the body and the body armor. U.S. Pat. No. 6,892,392 to Crye et al. describes a body armor vest having foam pads affixed to an interior of the vest defining multiple vertically extending air channels between the wearer and the vest, wherein the air channels promote ventilation and cooling of the wearer.

SUMMARY

The present disclosure is directed, in part, to garments, such as battlefield and analogous garments, worn under body armor to provide a durable, low stretch or no stretch outer layer covering regions of a user's body left exposed by the body armor with a ventilated, stretchable inner layer covering regions of the wearer's body covered by the body armor.

According to one aspect, an under body armor hybrid fabric garment comprises a first fabric portion and a second fabric portion. The first fabric portion comprises low stretch or no stretch fabric configured to cover an upper torso region of a user's body, wherein the first fabric portion covers a first body region left exposed by the body armor and extends into a second body transition region covered by the body armor. The second fabric portion comprises stretchable fabric configured to cover a lower torso region of the user's body underneath the body armor.

Implementations of this aspect may include one or more of the following additional features. The first fabric portion may be formed from low stretch woven fabric. The woven fabric can include a double weave construction (e.g., for increased insulation and/or decreased air permeability, such as for colder weather applications). The low stretch woven fabric is selected from the group of materials consisting of: synthetic yarns and/or fibers (e.g., polyester, nylon, etc.), natural yarns and/or fibers (e.g., cotton and/or wool), and specialty yarns and/or fibers (e.g., flame retardant yarns and/or fibers, including m-aramid (such as those sold by E.I. duPont under the trademark NOMEX®), melamine, flame retardant cotton, flame retardant nylon, a flame retardant treated cotton/nylon blend, modacrylic, and combinations thereof). The first fabric portion may be comprised of yarns and/or fibers resistant to melting and dripping when exposed to a flame or high temperatures. The first fabric portion has predetermined air permeability, e.g., the first fabric portion has predetermined air permeability in the range of between about 0 CFM to about 200 CFM, preferably between about 5 CFM to about 100 CFM, more preferably, between about 20 CFM and about 40 CFM. The second fabric portion may be formed from synthetic yarns and/or fibers (e.g., nylon, polyester, polypropylene, and combinations thereof), natural yarns and/or fibers, and/or combinations thereof. The second fabric portion may be comprised of flame retardant yarns and/or fibers (e.g., m-aramid, flame retardant treated cotton, acrylic, and combinations thereof). In some cases, the second fabric portion includes yarns and/or fibers resistant to melting and dripping when exposed to fire or high heat (e.g., cotton, wool, acrylic, and combinations thereof). The second fabric portion may be comprised of a fabric with one-way or two-way stretch. The second fabric portion has plated jersey, double knit, single jersey knit, single face terry loop in plated construction, or single face terry loop in non-plated construction. In some cases, the plated jersey construction can include a combination of nylon yarns and cotton yarns, wherein the nylon yarns are shown predominantly on the technical face of the fabric and the cotton yarns are shown predominantly on the technical back of the fabric. Alternatively, the plated jersey construction can include a combination of m-aramid yarns (e.g., NOMEX® yarns) and cotton yarns, wherein the m-aramid yarns are shown predominantly on the technical face of the fabric and the cotton yarns are shown predominantly on the technical back of the fabric. The second fabric portion has a plated jersey construction including a combination of a first set of m-aramid yarns and a second set of m-aramid yarns, wherein the first set of m-aramid yarns are shown predominantly on the technical face of the fabric and the second set of m-aramid yarns are shown predominantly on the technical back of the fabric. The second fabric portion has a plated jersey construction including a combination of m-aramid yarns and wool yarns, wherein the m-aramid yarns are shown predominantly on the technical face of the fabric and the wool yarns are shown predominantly on the technical back of the fabric. The second fabric portion has a plated jersey construction including a combination of nylon yarns and wool yarns, wherein the nylon yarns are shown predominantly on the technical face of the fabric and the wool yarns are shown predominantly on the technical back of the fabric. Preferably, the second fabric portion is comprised of wicking fabric, e.g. POWER DRY® textile fabric, as manufactured by Malden Mills Industries, Inc. of Lawrence, Mass. Spandex yarn can be included in the second fabric portions to form a fitted garment with enhanced resistance to folding, creases and bulging. The second fabric portion has denier gradient, i.e. relatively finer dpf on an outer surface of the fabric and relatively more coarse dpf on an inner surface of the fabric, for encouraging flow of liquid sweat from the inner surface of the second fabric portion to the outer surface of the second fabric portion (i.e., for better water management). The second fabric portion has predetermined air permeability, e.g., the second fabric portion may have predetermined air permeability greater than about 100 CFM. The second fabric portion has single face plated construction. Preferably, the single face plated construction includes a sinker loop surface, which defines the inner surface of the second fabric portion. The sinker loop surface can have raised sinker loop finish, velour (napped) finish, cut loop velour finish, or un-napped loop form. The sinker loop surface defines a plurality of discrete inner regions of loop yarn including one or more first discrete inner regions having first inner pile height, and defines one or more other discrete inner regions having contrasting inner pile height relatively greater than the first inner pile height, wherein the one or more first discrete inner regions of loop yarn, together with the one or more other discrete inner regions, define air channels between the user's skin and an opposed inner base surface of the fabric, thereby to facilitate ventilation and to reduce the number of contact points with the user's skin. The air channels comprise a plurality of vertical channels, horizontal channels, diagonal channels, or combinations thereof. The air channels may include a plurality of intersecting channels. The plurality of discrete inner regions of loop yarn are disposed in a pattern corresponding to one or more predetermined regions of the user's body. The plurality of discrete inner regions of loop yarns may be disposed on a front surface of the second fabric portion, on a back surface of the second fabric portion, or on both a front and a back surface of the second fabric portion. In some cases, the second fabric portion includes a double face fabric. The double face fabric can include a first surface defining an inner surface of the second fabric portion, the inner surface defining a plurality of discrete inner regions of loop yarn including one or more first discrete inner regions having first inner pile height, and defining one or more other discrete inner regions having contrasting inner pile height relatively greater than the first inner pile height, wherein the one or more first discrete inner regions of loop yarn, together with the one or more other discrete inner regions, define inner air channels between the user's skin and an opposed inner base surface of the fabric, thereby to facilitate ventilation and to reduce the number of contact points with the user's skin. The double face fabric still further comprises a second surface defining an outer surface of the second fabric portion, the outer surface defining a plurality of discrete outer regions of loop yarn, the discrete outer regions of loop yarn including one or more first discrete outer regions having first outer pile height, and one or more other discrete outer regions having contrasting outer pile height relatively greater than the first outer pile height, wherein the discrete outer regions of loop yarn, together with the one or more other discrete outer regions, define outer air channels between an inner surface of the body armor and an opposed outer base surface of the fabric, thereby to facilitate ventilation and to reduce the number of contact points with the inner surface of the body armor. The inner and/or outer air channels may comprise a plurality of vertical channels, horizontal channels, diagonal channels, or combinations thereof. The inner and/or out air channels may include a plurality of intersecting channels. The plurality of discrete inner regions of loop yarn may be disposed in a pattern corresponding to one or more predetermined regions of the user's body. The plurality of discrete inner and outer regions of loop yarn may be disposed on a front surface of the second fabric portion, a back surface of the second fabric portion, or both.

In another aspect, a battlefield garment system comprises a body armor element and an under-armor garment. The under-armor garment comprises a first textile fabric portion including low stretch fabric configured to cover an upper torso region of a user's body, the first textile fabric portion covering a first body region left exposed by the body armor element and extending into a second body transition region covered by the body armor element. The under-armor garment further comprises a second textile fabric portion comprising stretchable fabric configured to cover a lower torso region of the user's body underneath the body armor element.

Preferred implementations of this aspect may include one or more of the following additional features. The first textile fabric portion is configured to cover the user's shoulder regions and extends below the elbows down towards the user's wrists defining a pair of fabric arms. At least one of the fabric arms includes a pocket configured to carry ammunition. The first textile fabric portion has woven construction. The first textile fabric portion is treated with durable water repellent (DWR), camouflage and/or infrared radiation reduction. The second textile fabric portion comprises fibers of stretch and/or elastic material incorporated in the fabric. The second textile fabric portion includes a raised inner surface. The raised inner surface may be finished as raised sinker loop surface, velour surface, cut loop velour surface, or unnapped loop form. The raised inner surface defines one or more discrete inner regions of loop yarn including one or more first discrete inner regions having first inner pile height, and one or more other discrete inner regions having contrasting inner pile height relatively greater than the first inner pile height, wherein the one or more first discrete inner regions, together with the one or more other discrete inner regions, defines inner air channels between the user's skin and an opposed inner base surface of the fabric, thereby to facilitate ventilation, and to reduce the number of contact points with the user's skin. The first inner pile height is low pile, no pile or a combination thereof. The contrasting inner pile height is high pile, low pile, or combinations thereof. Preferably, the first discrete inner regions having first inner pile height comprise loop yarn formed to low pile height of between about 1.0 mm to about 3.0 mm. The other discrete inner regions comprise loop yarn formed to pile height in the range of greater than about 2.0 mm up to about 6.0 mm. The inner air channels comprise a plurality of vertical channels, horizontal channels, diagonal channels, or combinations thereof. The plurality of discrete inner regions of loop yarn correspond to one or more predetermined regions of the user's body selected from the group consisting of: spinal cord area, spine, back area, upper back area, lower back area, front chest area, breast area, and abdominal area. The discrete inner regions of loop yarn can be disposed on a front surface of the second textile fabric portion, on a back surface of the textile fabric portion, or on both a front surface and a back surface of the textile fabric portion. The second fabric portion may also include a raised outer surface. Preferably, the raised outer surface defines one or more discrete outer regions of loop yarn, the discrete outer regions of loop yarn including one or more first discrete outer regions having first outer pile height, and one or more other discrete outer regions having contrasting outer pile height relatively greater than the first outer pile height, wherein the one or more first discrete outer regions, together with the other discrete outer regions, define outer air channels between an inner surface of the body armor element and an opposed outer base surface of the fabric, thereby to facilitate ventilation and reduce the number of contact points with the inner surface of the body armor element. The first outer pile height may be low pile, no pile or a combination thereof, and preferably a pile height of about 1.0 mm to about 3.0 mm. The contrasting outer pile height may be high pile, low pile or a combination thereof, and preferably in the range of greater than about 2.0 mm up to about 6.0 mm. The outer air channels may comprise a plurality of horizontal and vertical channels. The plurality of inner and outer regions of loop yarn may be disposed on a front surface of the second textile fabric portion, a back surface of the second textile fabric portion, or on a front surface and a back surface of the second textile fabric portion.

In yet another aspect, a method of forming an under body armor hybrid fabric battlefield garment comprises the steps of: forming a first fabric portion corresponding to an upper torso region of a user's body from low stretch or no stretch fabric, wherein the first fabric portion covers a first body region left exposed by the body armor and extends into a second body transition region covered by the body armor; forming a second fabric portion corresponding to a lower torso region of the user's body from stretchable fabric, wherein the second fabric portion is configured to cover a lower torso region of the user's body underneath the body armor, and joining together the first and second fabric portions to form the hybrid fabric battlefield garment.

Preferred implementations of the method may include one or more of the following additional features. The step of forming the second fabric portion comprises combining yarns and/or fibers selected from the group consisting of: synthetic yarns and/or fibers, natural yarns and/or fibers, and combinations thereof to form a knit fabric. The step of forming the second fabric portion comprises combining yarns and/or fibers to form plated jersey fabric, double knit fabric, or single jersey knit fabric. The step of forming the second fabric portion comprises combining yarn and/or fibers to form single face plated fabric with plated sinker loop. Preferably, forming the single face fabric comprises finishing a first surface of the single face plated fabric to form one or more discrete inner regions of loop yarn, including, forming one or more first discrete inner regions having first inner pile height, and forming one or more other discrete inner regions having contrasting inner pile height relatively greater than the first inner pile height, wherein the one or more first discrete inner regions, together with the one or more other discrete inner regions, define inner air channels between the user's skin and an opposed inner base surface of the fabric, thereby to facilitate ventilation and to reduce the number of contact points with the user's skin. The first surface of the single face plated fabric may define an inner surface of the second fabric garment. The one or more discrete inner regions of loop yarn may be formed in a pattern corresponding to one or more predetermined regions of the user's body. The discrete inner regions of loop yarn may be disposed on a front surface of the second textile fabric portion, or on a back surface of the second fabric portion, or on a front surface and a back surface of the second fabric portion. The step of forming the second fabric portion comprises combining yarns and/or fibers to form double face fabric. In some cases, forming the double face fabric comprises finishing an inner surface of the double face fabric to form one or more discrete inner regions of loop yarn forming one or more first discrete inner regions having first inner pile height, and forming one or more other discrete inner regions having contrasting inner pile height relatively greater than the first inner pile height, wherein the one or more first discrete inner regions, together with the one or more other discrete inner regions, define inner air channels between the user's skin and an opposed inner base surface of the fabric, thereby to facilitate ventilation and to reduce the number of contact points with the user's skin. Forming the double face fabric further comprises finishing an outer surface of the double face fabric to form one or more discrete outer regions of loop yarn, forming one or more first discrete outer regions having first outer pile height, and one or more other discrete outer regions having contrasting outer pile height relatively greater than the first outer pile height, wherein the one or more first discrete outer regions, together with the other discrete outer regions, define outer air channels between an inner surface of the body armor and an opposed outer base surface of the fabric, thereby to facilitate ventilation and to reduce the number of contact points with the inner surface of the body armor. The inner surface of the double face fabric may define an inner surface of the second fabric garment, and the outer surface of the double face fabric defines an outer surface of the second fabric garment. The discrete inner and outer regions of loop yarn may be disposed on a front surface of the second fabric portion, or on a back surface of the second fabric portion, or on both a front and a back surface of the second fabric portion.

An under-the-armor battlefield garment is many times employed as the only garment layer, which requires it to serve the wearer as an outer layer, where left exposed by the body armor, as well as an inner layer underneath regions covered by the body armor. Therefore, there is need for an under-the-armor battlefield garment equipped to serve multiple requirements such as providing a tough, durable, low stretch or no stretch outer layer, and a comfortable, stretchable inner layer that provides adequate ventilation.

The details of one or more embodiments of the invention are set forth in the accompanying drawings and the description below. Other features, objects, and advantages of the invention will be apparent from the description and drawings, and from the claims.

DETAILED DESCRIPTION

Figure 2B:
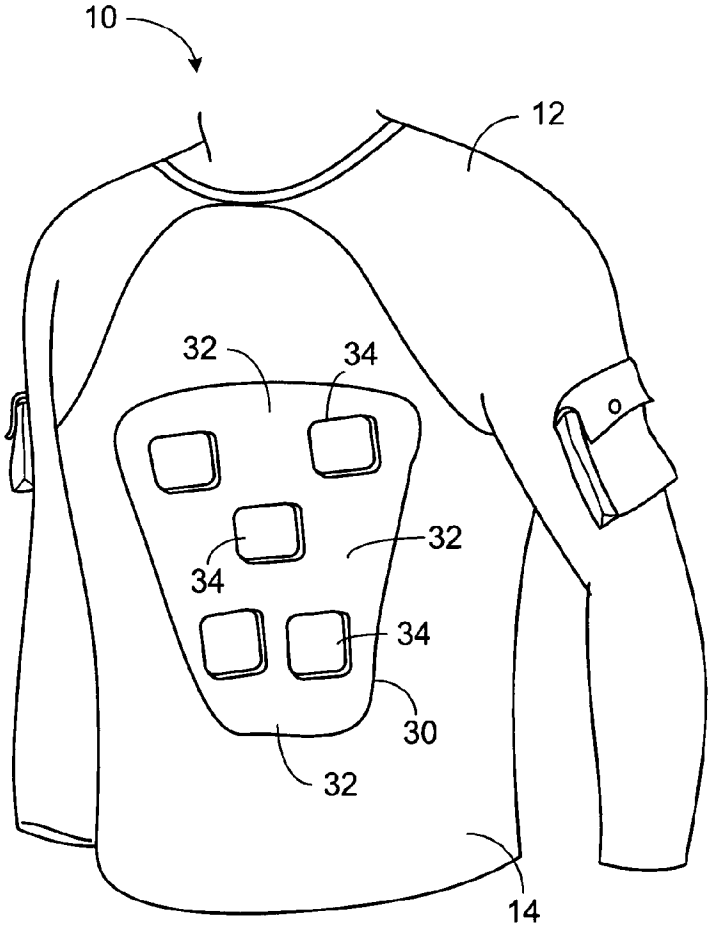
FIG. 2B is a front perspective view of a battlefield garment to be worn under body armor showing a plurality of discrete regions of loop yarn on an outer front surface of the garment, including a plurality of first discrete outer regions having a first pile height, and a plurality of other discrete outer regions having contrasting pile height relatively greater than the first pile height.
Figure 2A:
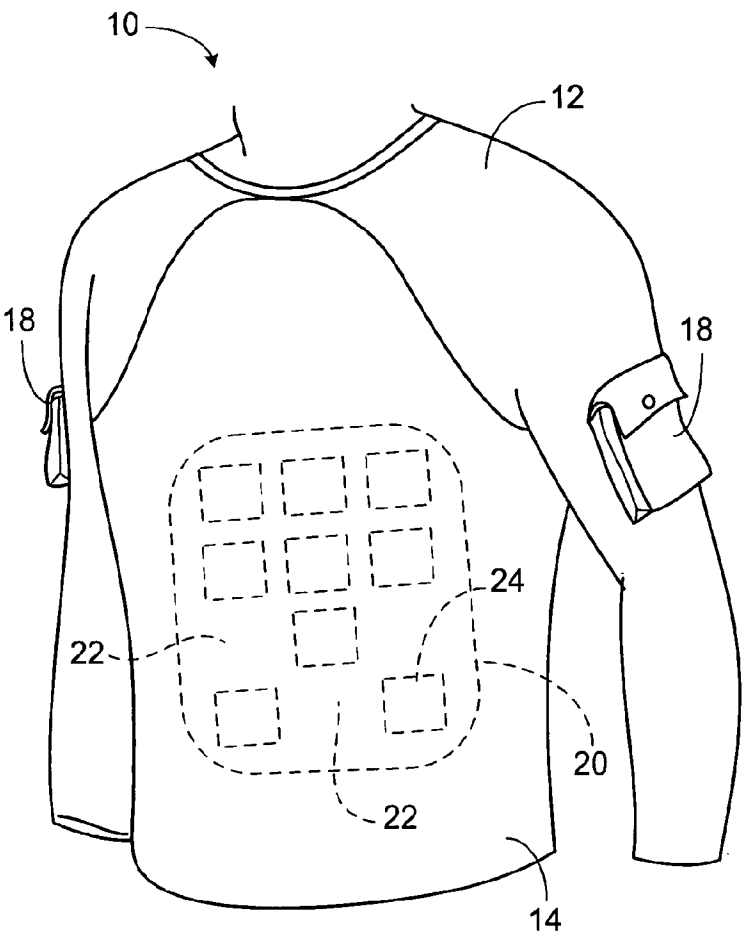
FIG. 2A is a front perspective view of a battlefield garment to be worn under body armor showing a plurality of discrete regions of loop yarn on an inner front surface of the garment, including a plurality of first discrete inner regions having a first pile height, and a plurality of other discrete inner regions having contrasting pile height relatively greater than the first pile height.
Figure 5B:
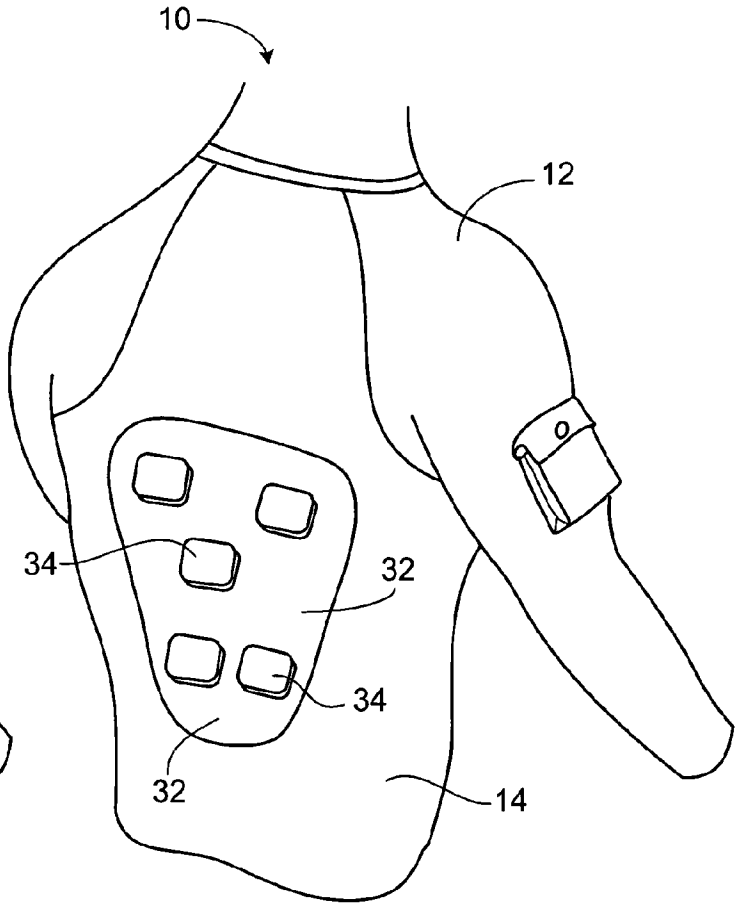
FIG. 5B is a rear perspective view of a battlefield garment to be worn under body armor showing a plurality of discrete regions of loop yarn on an outer back surface of the garment, including a plurality of first discrete outer regions having a first pile height, and a plurality of other discrete outer regions having contrasting pile height relatively greater than the first pile height.
Figure 5A:
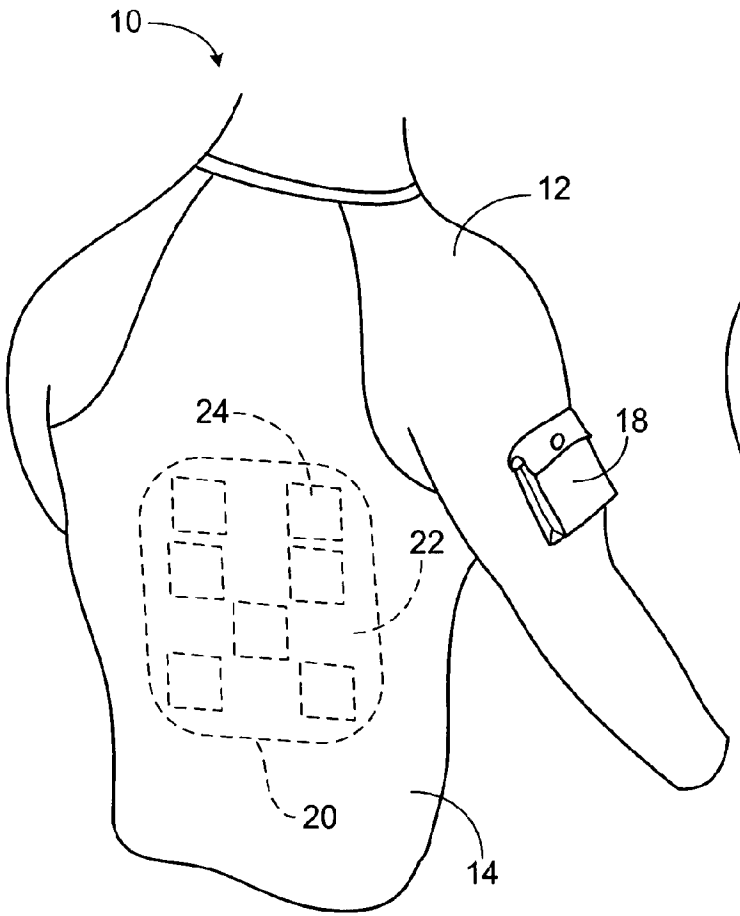
FIG. 5A is a rear perspective view of a battlefield garment to be worn under body armor showing a plurality of discrete regions of loop yarn on an inner back surface of the garment, including a plurality of first discrete inner regions having a first pile height, and a plurality of other discrete inner regions having contrasting pile height relatively greater than the first pile height.

Referring to FIGS. 1, 1A, 2A, 2B, 5A and 5B, a battlefield garment 10 has a first fabric portion 12 and a second fabric portion 14. Each fabric portion consists of a single layer fabric. The first and second fabric portions 12, 14, respectively, can be formed, for example, from two or more distinctive materials, each modifiable to meet different ambient conditions and/or different physical activities. The first fabric portion 12 is formed from a low or no stretch fabric and configured to cover an upper torso region of a user's body including a first body region 12' left exposed by body armor 16, extending into a second body transition region 12" covered by the body armor. As illustrated in FIGS. 2A and 5A, the first fabric portion 12 covers the user's shoulder regions and extends below the elbows down towards the user's wrists, and includes pockets 18 sewn into the arms, which allows the user/soldier to carry, e.g., extra ammunition and other utilities. The low or no stretch fabric is, preferably, a low stretch woven material or another non-stretchable material. A battlefield garment 10 formed of non-stretchable or low stretch material, e.g., like woven fabric in the upper portion 12 of the garment enables a soldier to carry more ammunition or other materials, placed in the pockets sewn on the woven sleeve, without stretching the fabric or distorting the fit of the garment. If the upper portion 12 of the garment were, instead, formed of knit or excessively stretchable woven fabric, heavy ammunition loaded into the pockets 18, would distort the garment fit, generate creases and folds, and cause chaffing with the edges or neck area of the body armor. In addition to being low or no stretch, the exposed region 12' of the first fabric portion 12 is required to be tough and durable, and may be treated with durable water repellent, camouflage, and/or infrared radiation reduction. Preferably, the first fabric portion 12 is formed of materials with flame retarding properties (e.g., m-aramid (such as NOMEX®), PBI®, melamine, flame retardant cotton, flame retardant nylon, a flame retardant treated cotton/nylon blend, and combinations thereof) or no-melt, no-drip properties upon exposure to fire.

Referring still to FIGS. 1, 1A, 2A, 2B, 5A and 5B, the second fabric portion 14 covers a lower torso region of the user's body and is designed to fit underneath the body armor 16. The second fabric portion 14 is formed of stretchable fabric and configured to cover a lower torso region of the user's body beneath the body armor 16. The stretchable fabric is preferably of knit construction, and more preferably of plated knit construction, with good wicking, good water management, and good breathability. In addition, forming the lower torso region of a slightly fitted fabric minimizes folding, creases and bulging, thereby to minimize chafing of the wearer's skin. The plated knit construction can be made with different yarn combinations, which can be adjusted, for example, according to the intended use. For example, for warm weather applications the plated knit construction can include a combination of nylon (or flame retardant) yarns and cotton yarns wherein the nylon (or flame retardant) yarns are arranged such that they appear predominantly on the technical face of the fabric and the cotton yarns are arranged such that they appear predominantly on the technical back of the fabric. For colder weather applications, for example, the plated knit construction can include a combination of nylon (or flame retardant) yarns and wool yarns wherein the nylon (or flame retardant) yarns are arranged such that they appear predominantly on the technical face of the fabric and the wool yarns are shown predominantly on the technical back of the fabric. The wool yarn can provide increased thermal insulation, as compared to cotton yarns, without detracting from tangential air flow in the area between the user's skin and opposed inner base surface of the fabric, thereby to minimize heat build-up under the body armor. The terms "technical face" and "technical back" generally refer to sides of the fabric as it exits the knitting machine. As used herein, the term technical face also refers to an outer surface of the second fabric portion.

Figure 1:
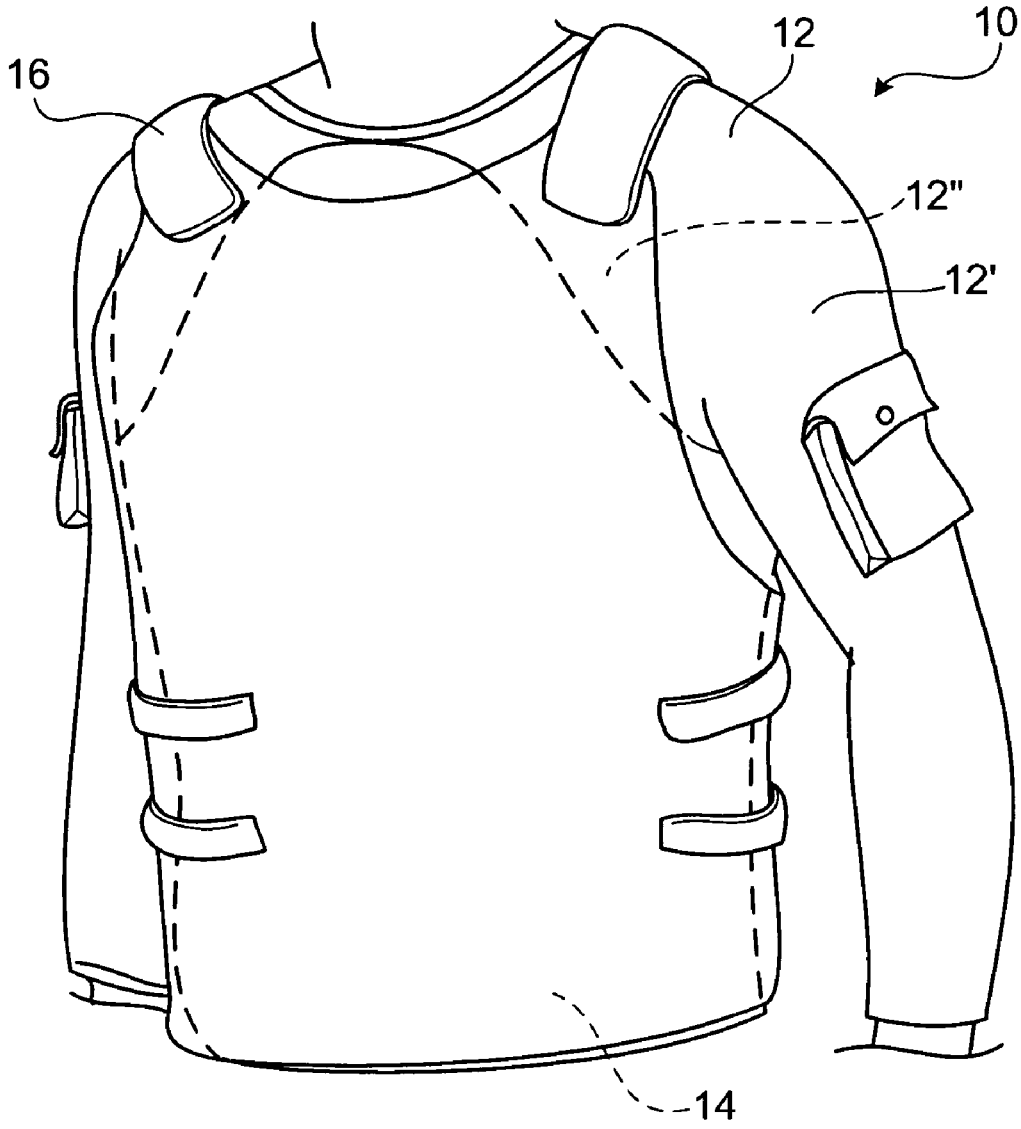
FIG. 1 is a front perspective view of a battlefield garment and body armor system.
Figure 1A:
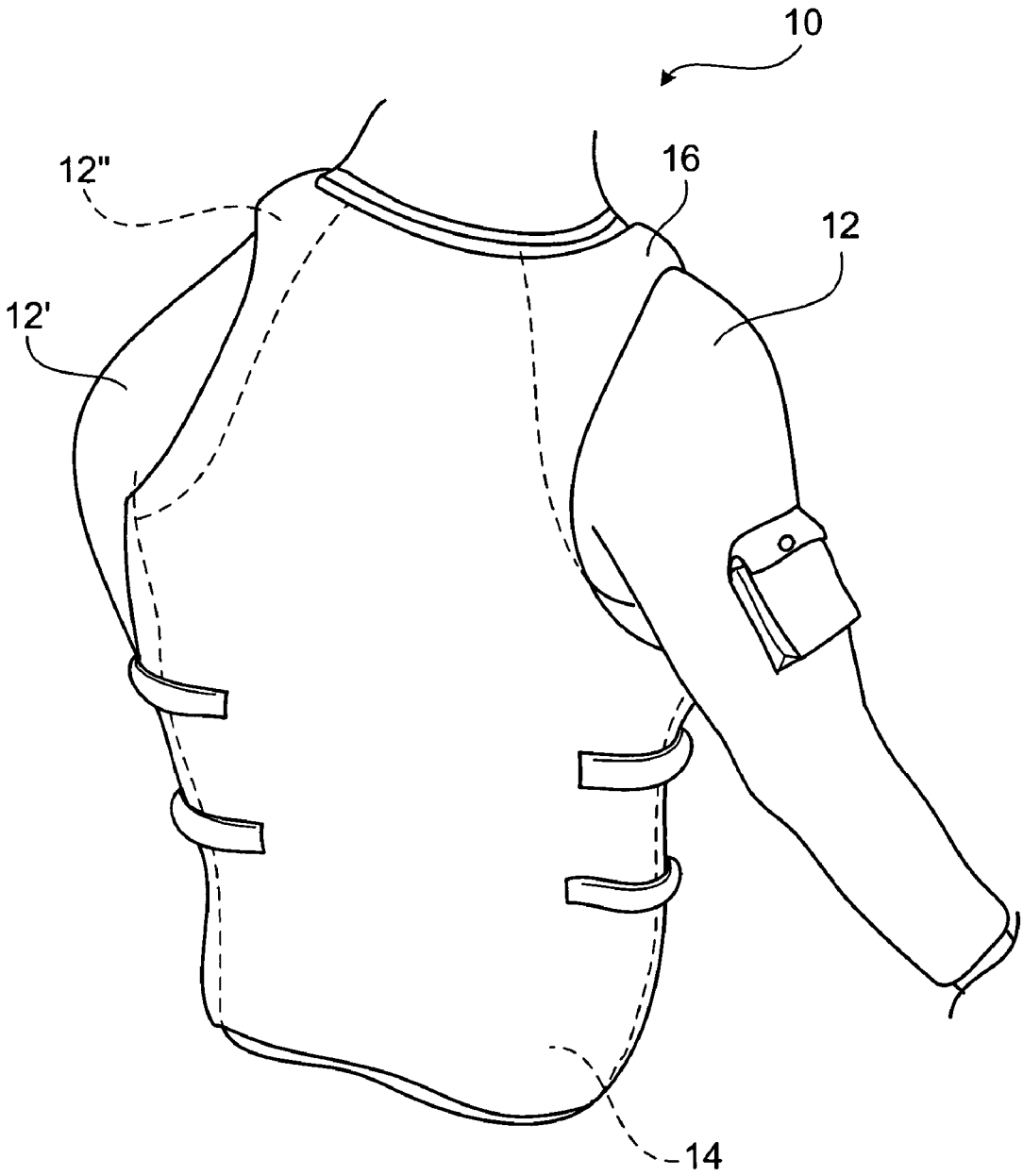
FIG. 1A is a rear perspective view of a battlefield garment and body armor system.
Figure 1B:
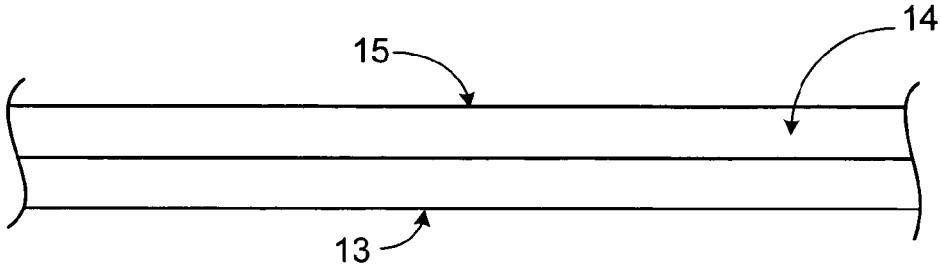
FIG. 1B is cross-sectional view of a second fabric portion of a battlefield garment having a plated jersey or double knit construction.

As illustrated in FIG. 1B, the second fabric portion 14 may have plated jersey or double knit construction. In this embodiment, second fabric portion 14 has a smooth inner surface 13 (the surface in contact with the user's skin) and a smooth outer surface 15 (the surface exposed to the body armor). Suitable materials include POWER DRY® textile fabric, as manufactured by Malden Mills Industries, Inc.

Figure 1C:
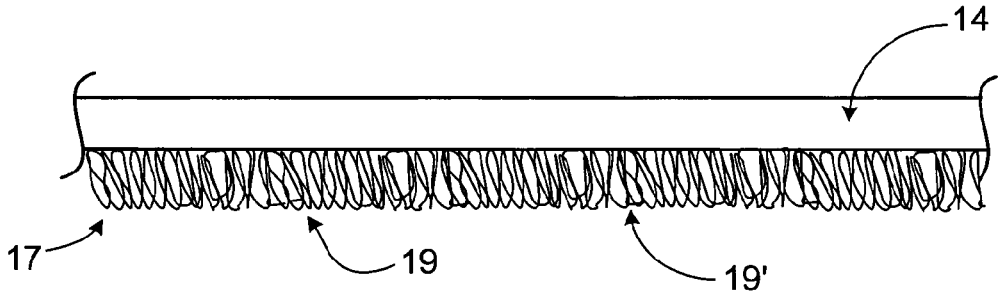
FIG. 1C is a cross-sectional view of a second fabric portion of a battlefield garment having a single jersey construction.
Figure 1D:
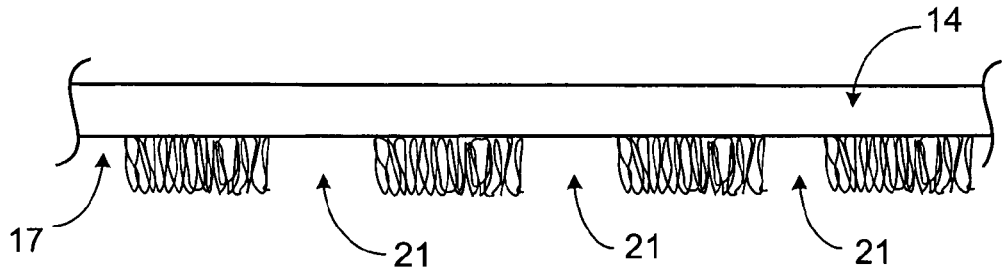
FIG. 1D is a cross-sectional view of a second fabric portion of a battlefield garment having a single face construction with air channels.

FIG. 1C illustrates an alternative embodiment wherein the second fabric portion 14 has single face plated construction, e.g. as in the POWER STRETCH® textile fabric, also as manufactured by Malden Mills Industries, Inc. According to this embodiment, a first surface 17 of the second fabric portion 14 is finished (e.g., in loop form 19, or velour (napped finish, or cut-loop velour 19') and defines an inner surface of the second fabric portion 14. The finished surface 19, 19' contacts the user's skin providing enhanced comfort, water management, and enhanced air movement and ventilation. The smooth outer surface 15 is exposed to the body armor. Alternatively, as illustrated in FIG. 1D, the first surface 17 may be finished in a pattern of contrasting pile heights, thereby forming channels 21 for enhanced air movement and ventilation. In an alternative embodiment, the pattern of contrasting pile heights may be arranged to correspond with one or more predetermined regions of the user's body, as shown in FIGS. 2A, 3, 5A and 6.

In addition, second fabric portion 14 may be finished, as described above, on both inner and outer surfaces for enhanced thermal insulation. For example, FIGS. 2A-7 illustrate a plurality of discrete regions of loop yarn 22, 24, 32, 34 disposed on inner and outer, and front and back, surfaces of the second fabric portion. The discrete regions of contrasting pile height upon the inner and outer, and front and back, surfaces of the second fabric portion 14 increase the comfort level and enhance air movement to reduce heat stress under the body armor 16. For example, as illustrated in FIGS. 2A and 5A, a plurality of discrete inner regions of loop yarn 20 are disposed upon an inner surface of the second fabric portion, between the user's skin and opposed inner base surface of the fabric, corresponding to predetermined regions of the user's body, including, for example, the spinal cord area, spine, back area, upper back area, lower back area, front chest area, breast area and abdominal area. The discrete inner regions of loop yarn 20 include a plurality of first discrete inner regions 22 having first pile height, and a plurality of other discrete inner regions 24 having contrasting pile height relatively greater than that of the first discrete inner regions 22. For example, the first pile height may be low pile, no pile or combinations thereof. Preferably, the low pile height is between about 1.0 mm and about 3.0 mm. The contrasting pile height may be high pile, low pile or combinations thereof, preferably, greater than about 2.0 mm up to about 6.0 mm.

Figure 3:
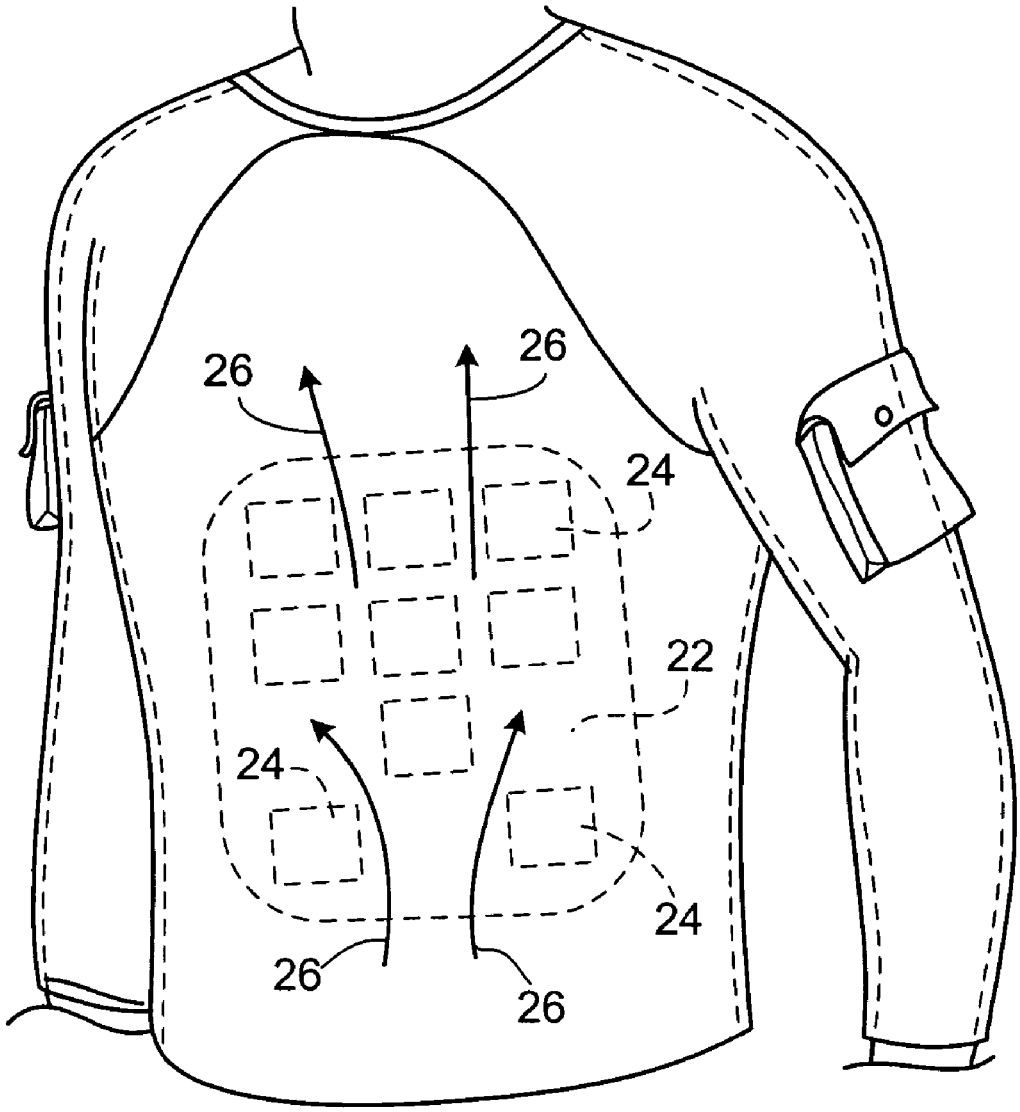
FIG. 3 is a front perspective view of the battlefield garment, illustrating the flow of ventilating air through channels formed between a user's skin and an opposed inner base surface of the fabric by a plurality of discrete regions of loop yarn on an inner front surface of the garment.
Figure 6:
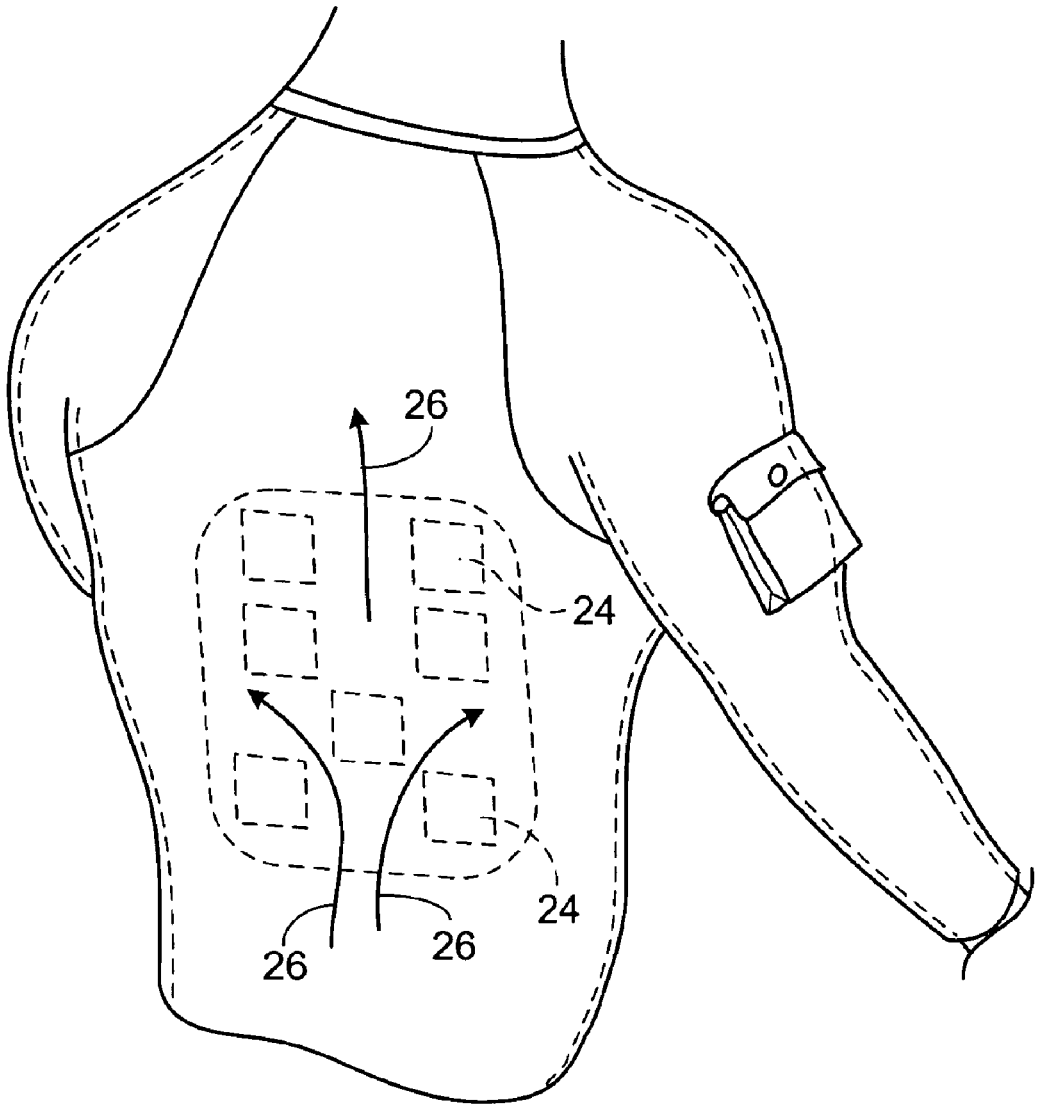
FIG. 6 is a rear perspective view of the battlefield garment illustrating the flow of ventilating air through channels formed between a user's skin and an opposed inner base surface of the fabric by a plurality of discrete regions of loop yarn on an inner back surface of the garment.

Referring to FIGS. 3 and 6, the first discrete inner regions 22, together with the other discrete inner regions 24, define air channels between the user's skin and the opposed inner base surface of the fabric, thereby facilitating ventilation, illustrated by arrows 26, and reducing the number of contact points with the user's skin.

Figure 4:
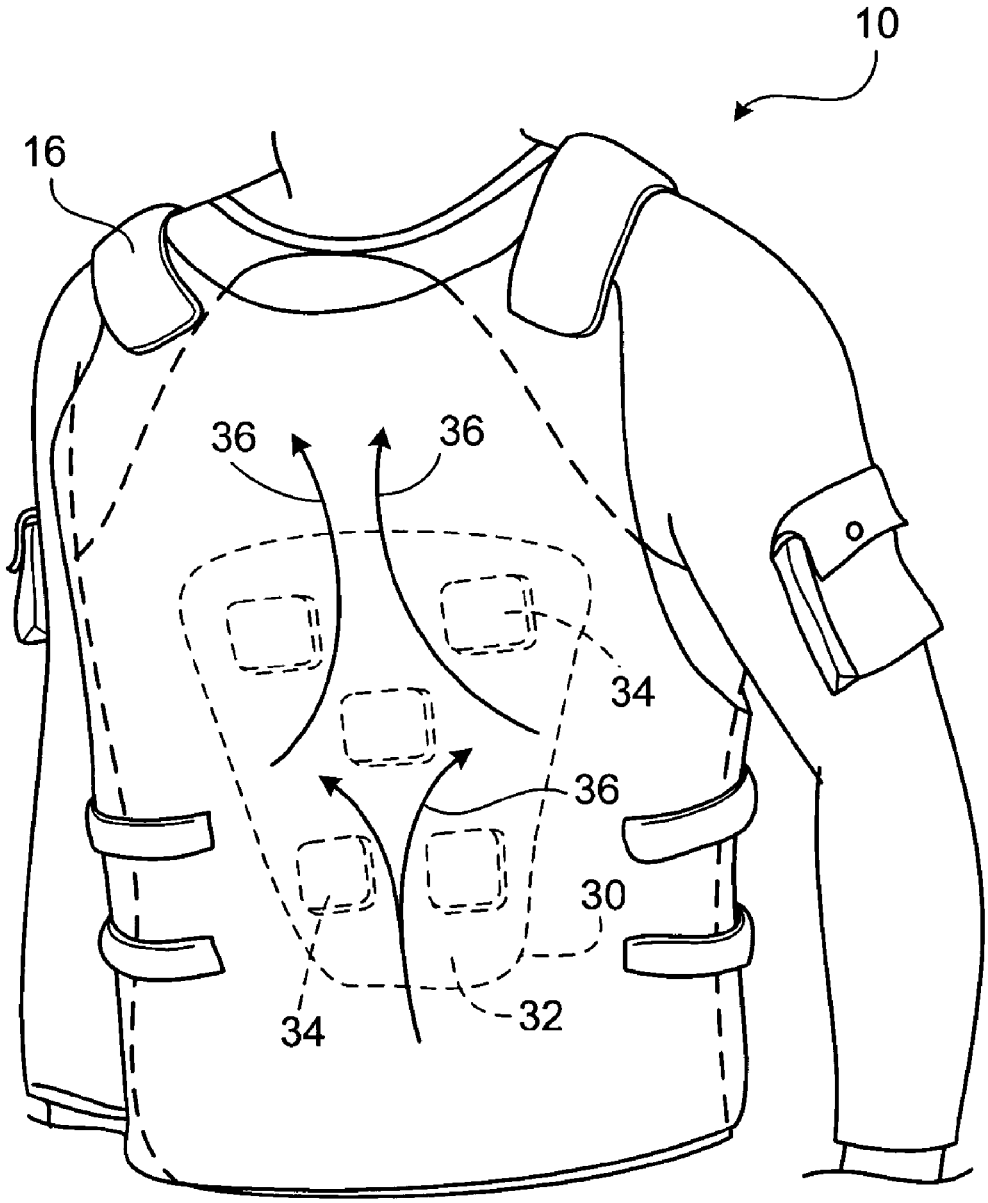
FIG. 4 is a front perspective view of a battlefield garment and body armor system illustrating the flow of ventilating air through channels formed between an inner surface of the body armor and an opposed outer base surface of the fabric by a plurality of discrete regions of loop yarn on an outer front surface of the garment.
Figure 7:
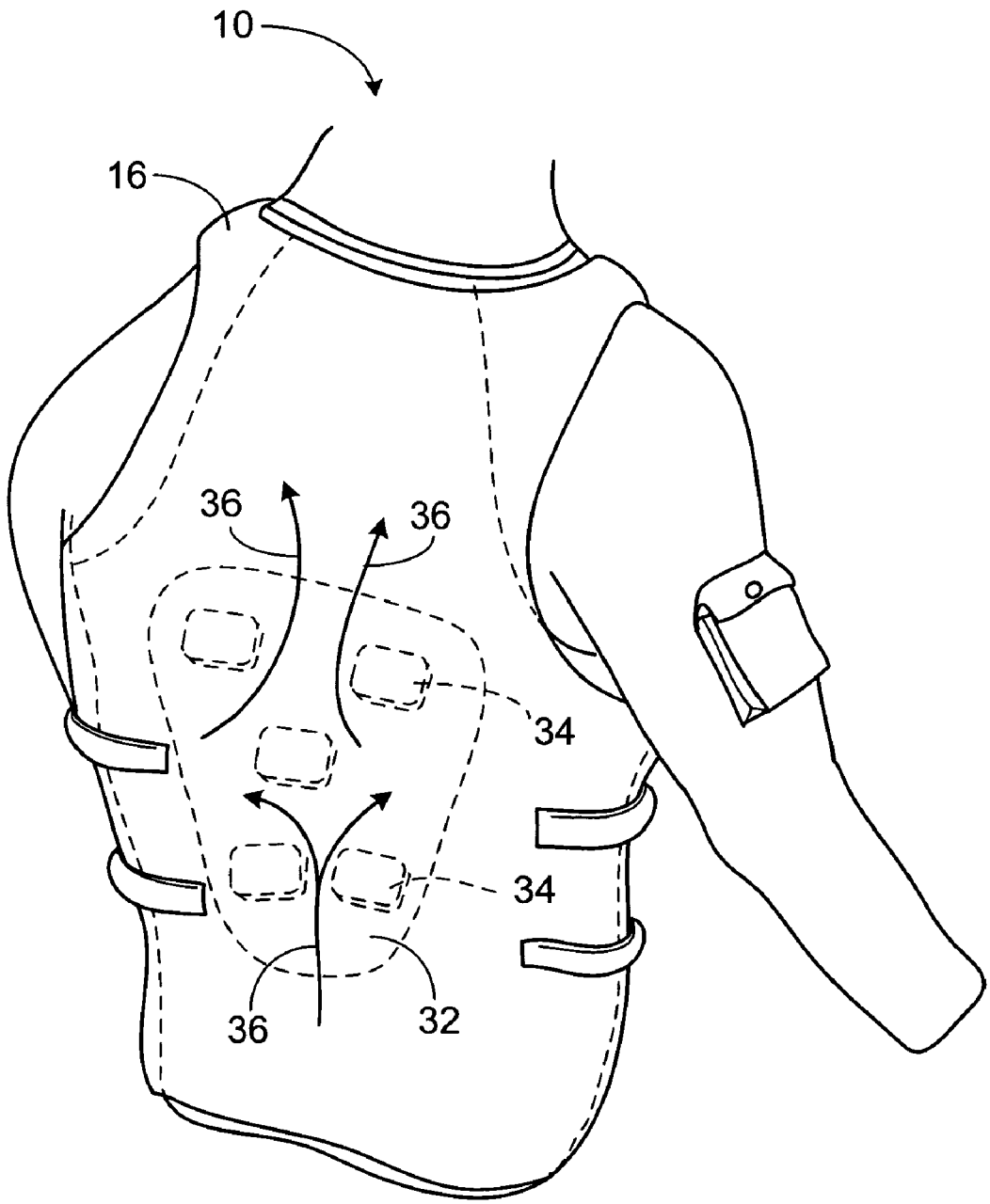
FIG. 7 is a rear perspective view of a battlefield garment and body armor system illustrating the flow of ventilating air through channels formed between an inner surface of the body armor and an opposed outer base surface of the fabric by a plurality of discrete regions of loop yarn on an outer back surface of the garment.

Additionally, FIGS. 2B and 5B illustrate an outer surface of the second fabric portion, with a plurality of discrete outer regions of loop yarn 30 disposed thereon and configured to fit between an inner surface the body armor and the opposed outer base surface of the fabric. The discrete outer regions of loop yarn 30 include a plurality of first discrete outer regions 32, having a first pile height, and a plurality of other discrete outer regions 34 having contrasting pile height relatively greater than that of the first discrete outer regions 32. For example, the first pile height may be low pile, no pile or combinations thereof. Preferably, the low pile height is between about 1.0 mm and about 3.0 mm. The contrasting pile height may be high pile, low pile, or combinations thereof, preferably, greater than about 2.0 mm up to about 6.0 mm. Referring to FIGS. 4 and 7, the first discrete outer regions 32, together with the other discrete outer regions 34, define air channels between the inner surface the body armor 16 and the opposed outer base surface of the fabric, thereby facilitating ventilation, illustrated by arrows 36, and reducing the number of contact points with the inner surface of the body armor.

A number of embodiments have been described. Nevertheless, it will be understood that various modifications may be made without departing from the spirit and scope of the disclosure. For example, the second fabric element may be produced by any procedure suitable for combining yarns and/or fibers to create regions with contrasting pile heights and/or regions of no pile. For improved stretch, the second fabric portions may have fibers of stretch and/or elastic material incorporated into the stitch yarn. The first and second fabric portions may have predetermined air permeability. For example, the first fabric portion may have predetermined air permeability of about 0 CFM to about 200 CFM, and the second fabric portion may have predetermined air permeability greater than about 100 CFM. Accordingly, other embodiments are within the scope of the following claims.

What is claimed is:

1. An under body armor hybrid fabric garment, comprising:

a first fabric portion comprising low stretch or no stretch fabric configured to cover an upper torso region of a user's body, the first fabric portion covering a first body region left exposed by the body armor and extending into a second body transition region covered by the body armor; and a second fabric portion comprising stretchable fabric configured to cover a lower torso region of the user's body underneath the body armor wherein the second fabric portion has an inner surface defining a plurality of discrete inner regions of loop yarn, including one or more first discrete inner regions of loop yarn having first inner pile height and one or more other discrete inner regions of loop yarn having contrasting inner pile height relatively greater than the first inner pile height, the one or more first discrete inner regions of loop yarn together with the one or more other discrete inner regions of loop yarn defining air channels between the user's skin and an opposed inner base surface of the fabric, thereby to facilitate ventilation and reduce contact points with the user's skin.

2. The hybrid fabric garment of claim 1, wherein the first fabric portion comprises low stretch woven fabric.

3. The hybrid fabric garment of claim 2, wherein the woven fabric comprises a double weave construction.

4. The hybrid fabric garment of claim 2, wherein the low stretch woven fabric comprises yarns and/or fibers selected from the group consisting of: synthetic yarns and/or fibers, natural yarns and/or fibers, and specialty yarns and/or fibers.

5. The hybrid fabric garment of claim 4, wherein the natural yarns and/or fibers are selected from the group consisting of: cotton yarns and/or fibers and wool yarns and/or fibers.

6. The hybrid fabric garment of claim 4, wherein the specialty yarns and/or fibers are flame retardant yarns and/or fibers.

7. The hybrid fabric garment of claim 6, wherein the flame retardant yarns and/or fibers are selected from the group consisting of: m-aramid, melamine, flame retardant cotton, flame retardant nylon, a flame retardant treated cotton/nylon blend, modacrylic, and combinations thereof.

8. The hybrid fabric garment of claim 1, wherein the first fabric portion comprises yarns and/or fibers resistant to melting and dripping when exposed to fire or high heat.

9. The hybrid fabric garment of claim 1, wherein the first fabric portion has predetermined air permeability.

10. The hybrid fabric garment of claim 9, wherein the predetermined air permeability is in the range of about 0 CFM to about 200 CFM.

11. The hybrid fabric garment of claim 10, wherein the predetermined air permeability is in the range of between about 5 CFM to about 100 CFM.

12. The hybrid fabric garment of claim 11, wherein the predetermined air permeability is in the range of between about 20 CFM to about 40 CFM.

13. The hybrid fabric garment of claim 1, wherein the second fabric portion comprises yarns and/or fibers selected from the group consisting of: synthetic yarns and/or fibers, natural yarns and/or fibers, and combinations thereof.

14. The hybrid fabric garment of claim 13, wherein the synthetic yarns and/or fibers are selected from the group consisting of: nylon, polyester, polypropylene and combinations thereof.

15. The hybrid fabric garment of claim 1, wherein the second fabric portion comprises flame retardant yarns and/or fibers.

16. The hybrid fabric garment of claim 15, wherein the flame retardant yarns and/or fibers are selected from: m-aramid, flame retardant treated cotton, acrylic, and combinations thereof.

17. The hybrid fabric garment of claim 1, wherein the second fabric portion comprises yarns and/or fibers resistant to melting and dripping when exposed to fire or high heat.

18. The hybrid fabric garment of claim 17, wherein the second fabric portion comprises yarns and/or fibers selected from the group consisting of cotton, wool, acrylic, and combinations thereof.

19. The hybrid fabric garment of claim 1, wherein the second fabric portion comprises a fabric having a plated jersey construction.

20. The hybrid fabric garment of claim 1, wherein the second fabric portion comprises fabric with one-way stretch.

21. The hybrid fabric garment of claim 1, wherein the second fabric portion comprises fabric with two-way stretch.

22. The hybrid fabric garment of claim 1, wherein the second fabric portion comprises double knit construction.

23. The hybrid fabric garment of claim 1, wherein the second fabric portion comprises single jersey knit construction.

24. The hybrid fabric garment of claim 1, wherein the second fabric portion comprises single face terry loop in plated construction.

25. The hybrid fabric garment of claim 1, wherein the second fabric portion comprises single face terry loop in non-plated construction.

26. The hybrid fabric garment of claim 1, wherein the second fabric portion comprises spandex in a form fitted fabric for enhanced resistance to folding, creasing and bulging.

27. The hybrid fabric garment of claim 1, wherein the second fabric portion comprises moisture wicking fabric.

28. The hybrid fabric garment of claim 27, wherein the moisture wicking fabric comprises an outer surface formed of yarn and/or fibers of relatively fine denier per filament and an inner surface formed of yarn and/or fibers of relatively coarse denier per filament, for encouraging flow of liquid sweat from the inner surface of the second fabric portion toward the outer surface of the second fabric portion.

29. The hybrid fabric garment of claim 1, wherein the second fabric portion has predetermined air permeability.

30. The hybrid fabric garment of claim 29, wherein the predetermined air permeability is greater than about 100 CFM.

31. The hybrid fabric garment of claim 1, wherein the second fabric portion comprises single face plated construction.

32. The hybrid fabric garment of claim 1, wherein the inner surface has raised sinker loop finish, velour finish, or cut loop velour finish.

33. The hybrid fabric garment of claim 1, wherein the air channels comprise a plurality of vertical channels, horizontal channels, diagonal channels, or combinations thereof.

34. The hybrid fabric garment of claim 33, wherein the air channels comprise a plurality of intersecting channels.

35. The hybrid fabric garment of claim 1, wherein the plurality of discrete inner regions of loop yarn are disposed in a pattern corresponding to one or more predetermined regions of the user's body.

36. The hybrid fabric garment of claim 1, claim 33, claim 34 or claim 35, wherein the plurality of discrete inner regions of loop yarn are disposed on a front surface of the second fabric portion.

37. The hybrid fabric garment of claim 1, claim 33, claim 34 or claim 35, wherein the plurality of discrete inner regions of loop yarn are disposed on a back surface of the second fabric portion.

38. The hybrid fabric garment of claim 1, claim 33, claim 34 or claim 35, wherein the plurality of discrete inner regions of loop yarn are raised on both a front surface and a back surface of the second fabric portion.

39. An under body armor hybrid fabric garment, comprising:

a first fabric portion comprising low stretch or no stretch fabric configured to cover an upper torso region of a user's body, the first fabric portion covering a first body region left exposed by the body armor and extending into a second body transition region covered by the body armor; and a second fabric portion comprising stretchable fabric configured to cover a lower torso region of the user's body underneath the body armor;

wherein the second fabric portion comprises a double face fabric, and wherein said double face fabric comprises a first surface defining an inner surface of the second fabric portion having one or more first discrete inner regions of loop yarn having first inner pile height and one or more other discrete inner regions of loop yarn having contrasting inner pile height relatively greater than the first inner pile height, the one or more first discrete inner regions of loop yarn together with the one or more other discrete inner regions of loop yarn defining inner air channels between the user's skin and an opposed inner base surface of the fabric, thereby to facilitate ventilation and to reduce the number of contact points with the user's skin; and said double face fabric further comprises a second surface defining an outer surface of the second fabric portion having one or more first discrete outer regions of loop yarn having first outer pile height and one or more other discrete outer regions of loop yarn having contrasting outer pile height relatively greater than the first outer pile height, the one or more first discrete outer regions of loop yarn together with the one or more other discrete outer regions of loop yarn, defining outer air channels between an inner surface of the body armor and an opposed outer base surface of the fabric, thereby to facilitate ventilation and to reduce the number of contact points with the inner surface of the body armor.

40. The hybrid fabric garment of claim 39, wherein the inner air channels comprise a plurality vertical channels, horizontal channels, diagonal channels, or combinations thereof.

41. The hybrid fabric garment of claim 39, wherein the inner air channels comprise a plurality of intersecting channels.

42. The hybrid fabric garment of claim 39, wherein the outer air channels comprise a plurality vertical channels, horizontal channels, diagonal channels, or combinations thereof.

43. The hybrid fabric garment of claim 42, wherein the outer air channels comprise a plurality of intersecting channels.

44. The hybrid fabric garment of claim 39, wherein the plurality of discrete inner regions of loop yarn are disposed in a pattern corresponding to one or more predetermined regions of the user's body.

45. The hybrid fabric garment of claim 39, claim 40, claim 41, claim 42, claim 43 or claim 44, wherein the plurality of discrete inner and outer regions of loop yarn are disposed on a front surface of the second fabric portion.

46. The hybrid fabric garment of claim 39, claim 40, claim 41, claim 42, claim 43 or claim 44, wherein the plurality of discrete inner and outer regions of loop yarn are disposed on a back surface of the second fabric portion.

47. The hybrid fabric garment of claim 39, claim 40, claim 41, claim 42, claim 43 or claim 44, wherein the plurality of discrete inner and outer regions of loop yarn are disposed on both a front surface and a back surface of the second fabric portion.

48. A battlefield garment system, comprising:

a body armor element; and an under-armor garment, comprising:

a first textile fabric portion comprising low stretch fabric configured to cover an upper torso region of a user's body, said first textile fabric portion covering a first body region left exposed by the body armor element and extending into a second body portion covered by the body armor element; and a second textile fabric portion comprising stretchable fabric configured to cover a lower torso region of the user's body underneath the body armor element, wherein the second textile fabric portion has an inner surface defining one or more first discrete inner regions of loop yarn having first inner pile height and one or more other discrete inner regions of loop yarn having contrasting inner pile height relatively greater than the first inner pile height, the one or more first discrete inner regions of loop yarn together with the one or more other discrete inner regions of loop yarn defining inner air channels between the user's skin and an opposed inner base surface of the fabric, thereby to facilitate ventilation and to reduce the number of contact points with the user's skin.

49. The battlefield garment system of claim 48, wherein the first textile fabric portion is configured to cover the user's shoulder regions and extend below the elbows down towards the user's wrists, defining a pair of fabric arms.

50. The battlefield garment system of claim 49, wherein at least one of the fabric arms comprises a pocket configured to carry ammunition.

51. The battlefield garment system of claim 48, wherein the first textile fabric portion comprises woven construction.

52. The battlefield garment system of claim 48, wherein the first textile fabric portion is treated with fabric treatment selected from the group consisting of: durable water repellent, camouflage and infrared radiation reduction.

53. The battlefield garment system of claim 48, wherein the second textile fabric portion further comprises fibers of stretch and/or elastic material.

54. The battlefield garment system of claim 48, wherein the inner surface has a finish selected from the group consisting of: raised sinker loop surface, velour surface, stand alone loop un-napped, and cut loop velour surface.

55. The battlefield garment system of claim 48, wherein the first inner pile height is selected from the group consisting of: low pile, no pile and combinations thereof, and wherein the contrasting inner pile height is selected from the group consisting of: high pile, low pile, and combinations thereof.

56. The battlefield garment system of claim 48, wherein the first discrete inner regions having first inner pile height comprise loop yarn formed to low pile height in the range of between about 1.0 mm to about 3.0 mm.

57. The battlefield garment system of claim 48, wherein the other discrete inner regions having contrasting inner pile height relatively greater than the first inner pile height comprise loop yarn formed to pile height in the range of greater than about 2.0 mm up to about 6.0 mm.

58. The battlefield garment system of claim 48, wherein the inner air channels comprise a plurality of vertical channels, horizontal channels, diagonal channels, or combinations thereof.

59. The battlefield garment system of claim 58, wherein the inner air channels comprise a plurality intersecting channels.

60. The battlefield garment system of claim 48, wherein the plurality of discrete inner regions of loop yarn correspond to one or more predetermined regions of the user's body selected from the group consisting of: spinal cord area, spine, back area, upper back area, lower back area, front chest area, breast area, and abdominal area.

61. The battlefield garment of claim 48, claim 55, claim 56, claim 57, claim 58 or claim 59, wherein the discrete inner regions of loop yarn are disposed on a front surface of the second textile fabric portion.

62. The battlefield garment of claim 48, claim 55, claim 56, claim 57, claim 58 or claim 59, wherein the discrete inner regions of loop yarn are disposed on a back surface of the second textile fabric portion.

63. The battlefield garment of claim 48, claim 55, claim 56, claim 57, claim 58 or claim 59 or 60, wherein the discrete inner regions of loop yarn are raised on both a front surface and a back surface of the second fabric portion.

64. The battlefield garment of claim 48, wherein the second textile fabric portion has a raised outer surface.

65. The battlefield garment of claim 64, wherein the raised outer surface defines one or more first discrete outer regions of loop yarn having first outer pile height and one or more other discrete outer regions of loop yarn having contrasting outer pile height relatively greater than the first outer pile height, the one or more first discrete outer regions of loop yarn together with the other discrete outer regions of loop yarn defining outer air channels between an inner surface of the body armor element and an opposed outer base surface of the fabric, thereby to facilitate ventilation and to reduce the number of contact points with the inner surface of the body armor element.

66. The battlefield garment system of claim 64, wherein the first outer pile height is selected from the group consisting of: low pile, no pile and combinations thereof, and wherein the contrasting out pile height is selected from the group consisting of: high pile, low pile, and combinations thereof.

67. The battlefield garment system of claim 64, wherein the first discrete outer regions having first outer pile height comprise loop yarn formed to low pile height in the range of about 1.0 mm to about 3.0 mm.

68. The battlefield garment system of claim 64, wherein the other discrete outer regions having contrasting pile outer pile height relatively greater than the first outer pile height comprise loop yarns formed to pile height in the range of greater than about 2.0 mm up to about 6.0 mm.

69. The battlefield garment system of claim 65, wherein the outer air channels comprise a plurality of intersecting vertical and horizontal channels.

70. The battlefield garment system of claim 65, claim 66, claim 67, claim 68 or claim 69, wherein the plurality of discrete inner and outer regions of loop yarn are disposed on a front surface of the second textile fabric portion.

71. The battlefield garment system of claim 65, claim 66, claim 67, claim 68 or claim 69, wherein the plurality of discrete inner and outer regions of loop yarn are disposed on a back surface of the second textile fabric portion.

72. The battlefield garment system of claim 65, claim 66, claim 67, claim 68 or claim 69, wherein the plurality of discrete inner and outer regions of loop yarn are disposed on both a front surface and a back surface of the second textile fabric portion.

73. A method of forming a hybrid fabric battlefield garment for use in cooperation with body armor, said method comprising the steps of:

forming a first fabric portion corresponding to an upper torso region of a user's body from low stretch or no stretch fabric, the first fabric segment configured to cover a first body region left exposed by the body armor and extend into a second body transition region covered by the body armor;

forming a second fabric portion corresponding to a lower torso region of the user's body from stretchable fabric, the second fabric portion configured to cover a lower torso region of the user's body underneath the body armor; and joining together the first and second fabric portion to form the hybrid fabric battlefield garment, wherein forming the second fabric portion comprises finishing a first surface of the second fabric portion to form one or more discrete inner regions of loop yarn, including:

forming one or more first discrete inner regions of loop yarn having first inner pile height, and forming one or more other discrete inner regions of loop yarn having contrasting inner pile height relatively greater than the first inner pile height, the one or more first discrete inner regions of loop yarn together with the one or more other discrete inner regions of loop yarn defining inner air channels between the user's skin and an opposed inner base surface of the fabric, thereby to facilitate ventilation and to reduce the number of contact points with the user's skin.

74. The method of forming a battlefield garment of claim 73, wherein forming the second fabric portion comprises combining yarns and/or fibers selected from the group consisting of: synthetic yarns and/or fibers, natural yarns and/or fibers, and combinations thereof to form a knit fabric.

75. The method of forming a battlefield garment of claim 73, wherein forming the second fabric portion comprises combining yarns and/or fibers to form plated jersey fabric, a double knit fabric, a single jersey fabric, a single face terry loop fabric in plated construction, or a single face terry loop fabric in non-plated construction.

76. The method of forming a battlefield garment of claim 73, wherein forming the second fabric portion comprises combining yarns and/or fibers to form double knit fabric.

77. The method of forming a battlefield garment of claim 73, wherein forming the second fabric portion comprises combining yarns and/or fibers to form single jersey knit fabric.

78. The method of forming a battlefield garment of claim 73, wherein forming the second fabric portion comprises combining yarns and/or fibers to form single face plated fabric with plated sinker loop.

79. The method of forming a battlefield garment of claim 73, wherein the first surface defines an inner surface of the second fabric portion.

80. The method of forming a battlefield garment of claim 73, wherein the one or more discrete inner regions of loop yarn are formed in a pattern corresponding to one or more predetermined regions of the user's body.

81. The method of forming a battlefield garment of claim 73, claim 79 or claim 80, wherein the discrete inner regions of loop yarn are disposed on a front surface of the second textile fabric portion.

82. The method of forming a battlefield garment of claim 73, claim 79 or claim 80, wherein the discrete inner regions of loop yarn are disposed on a back surface of the second textile fabric portion.

83. The method of forming a battlefield garment of claim 73, claim 79 or claim 80, wherein the discrete inner and outer regions of loop yarn are disposed on both a front surface and a back surface of the second fabric portion.

84. A method of forming a hybrid fabric battlefield garment for use in cooperation with body armor, said method comprising the steps of:

forming a first fabric portion corresponding to an upper torso region of a user's body from low stretch or no stretch fabric, the first fabric segment configured to cover a first body region left exposed by the body armor and extend into a second body transition region covered by the body armor;

forming a second fabric portion corresponding to a lower torso region of the user's body from stretchable fabric, the second fabric portion configured to cover a lower torso region of the user's body underneath the body armor; and joining together the first and second fabric portion to form the hybrid fabric battlefield garment, wherein forming the second fabric portion comprises combining yarns and/or fibers to form double face fabric, and wherein forming the double face fabric comprises:

finishing an inner surface of the double face fabric to form one or more first discrete inner regions of loop yarn having first inner pile height and forming one or more other discrete inner regions of loop yarn having contrasting inner pile height relatively greater than the first inner pile height, the one or more first discrete inner regions of loop yarn together with the one or more other discrete inner regions of loop yarn defining inner air channels between the user's skin and an opposed inner base surface of the fabric, thereby to facilitate ventilation, and to reduce the number of contact points with the user's skin; and finishing an outer surface of the double face fabric to form one or more first discrete outer regions of loop yarn having first outer pile height and forming one or more other discrete outer regions of loop yarn having contrasting outer pile height relatively greater than the first outer pile height, the one or more first discrete outer regions of loop yarn together with the other discrete outer regions of loop yarn defining outer air channels between an inner surface of the body armor and an opposed outer base surface of the fabric, thereby to facilitate ventilation, and to reduce the number of contact points with the inner surface of the body armor.

85. The method of forming a battlefield garment of claim 84, wherein the inner surface of the double face fabric defines an inner surface of the second fabric garment, and the outer surface of the double face fabric defines an outer surface of the second fabric garment.

86. The method of forming a hybrid battlefield garment of claim 85, wherein the discrete inner and outer regions of loop yarn are disposed on a front surface of the second fabric portion.

87. The method of forming a hybrid battlefield garment of claim 85, wherein the discrete inner and outer regions of loop yarn are disposed on a back surface of the second fabric portion.

88. The method of forming a hybrid battle filed garment of claim 85, wherein the discrete inner and outer regions of loop yarn are disposed on both a front surface and a back surface of the second fabric portion.

*89. An under body armor hybrid fabric garment, comprising:*

*a first fabric portion comprising a low stretch or no stretch fabric configured to cover an upper torso region of a body of a user, the first fabric portion comprising flame retardant yarns and/or fibers and covering at least a first body region left exposed by a body armor; and*

*a second fabric portion comprising a stretchable fabric configured to cover a lower torso region of the body of the user underneath the body armor,*

*wherein the second fabric portion has an inner surface defining a pattern of regions having contrasting pile heights, the pattern including one or more first regions*

*having first pile heights including pile or no pile and one or more second regions having second pile heights locally greater than the first pile heights, the one or more first regions defining air channels among and spacing apart the one or more second regions on the inner surface, and*

*wherein the second fabric portion comprises a single face plaited construction comprising flame retardant yarns and/or fibers or yarns and/or fibers resistant to melting and dripping when exposed to fire or high heat, with the pattern of regions being disposed on at least a back surface of the second fabric portion.*

*90. The hybrid fabric garment of claim 89, wherein the pattern of regions covers the entire inner surface of the second fabric portion.*

*91. The hybrid fabric garment of claim 89, wherein the pattern of regions is configured to cover one or more selected first regions of the second fabric portion corresponding to one or more predetermined regions of the user's body, and wherein other regions of the second fabric portion are configured to cover one or more selected second regions of the second fabric portion, said other regions comprising plain knit construction.*

*92. The hybrid fabric garment of claim 89, wherein the second fabric portion has predetermined air permeability greater than about 100 CFM.*

*93. The hybrid fabric garment of claim 89, wherein the first fabric portion is configured to cover the user's shoulder regions and extend below the elbows down towards the user's wrists, defining a pair of fabric arms, at least one of the fabric arms comprising a pocket configured to carry ammunition.*

*94. The hybrid fabric garment of claim 89, wherein the first fabric portion has predetermined low air permeability of about 0 CFM to about 200 CFM.*

*95. The hybrid fabric garment of claim 89, wherein the first fabric portion comprises a fabric treated with a treatment selected from the group consisting of: durable water repellent, camouflage, and infrared radiation reduction.*

*96. The under body armor hybrid fabric garment of claim 89, further comprising a body armor element disposed to overly the second fabric portion over a lower torso region of the user's body.*

*97. A method of forming an under body hybrid fabric battlefield garment for use in cooperation with body armor, said method comprising the steps of:*

*forming a first fabric portion corresponding to an upper torso region of a body of a user from a low stretch or no stretch fabric comprising flame retardant yarns and/or fibers, the first fabric portion being configured to cover at least a first body region left exposed by the body armor;*

*forming a second fabric portion corresponding to a lower torso region of the body of the user from stretchable fabric comprising flame retardant yarns and/or fibers or yarns and/or fibers resistant to melting and dripping when exposed to fire or high heat, the second fabric portion comprising a single face plaited construction with a pattern of regions extending at least on a back surface of the second body portion and haying contrasting pile heights, including one or more first regions having first pile heights including low pile and no pile and one or more second regions having second pile heights locally greater than the first pile heights, the one or more first regions defining inner air channels among and spacing apart the one or more second regions on the surface of the second fabric portion, the second fabric portion being configured to cover the lower torso region of the user's body underneath the body armor; and*

*joining the first and second fabric portions to form the hybrid fabric battlefield garment.*

*98. The method of forming a battlefield garment of claim 97, wherein the pattern of regions extends on the entire surface of the second fabric portion.*

*99. The method of forming a battlefield garment of claim 97, further comprising treating the first fabric portion with fabric treatment selected from the group consisting of: durable water repellent, camouflage and infrared radiation reduction.*

*100. The method of forming a battlefield garment of claim 97, wherein forming the first fabric portion comprises the step of:*

*configuring the first fabric portion to cover the user's shoulder regions and extend below the elbows down towards the user's wrists, defining a pair of fabric arms, at least one of the fabric arms comprising a pocket configured to carry ammunition.*

*101. The method of forming a battlefield garment of claim 97, wherein forming the battlefield garment comprises the steps of:*

*forming elements of the first fabric portion,*

*forming elements of the second fabric portion with the pattern of regions in selected regions corresponding to one or more predetermined regions of the user's body,*

*forming elements of other regions of the second fabric portion with plain knit construction; and*

*forming the battlefield garment by joining the elements together.*

* * * * *

UNITED STATES PATENT AND TRADEMARK OFFICE

CERTIFICATE OF CORRECTION

PATENT NO. : RE43,589 E
APPLICATION NO. : 13/160685
DATED : August 21, 2012
INVENTOR(S) : Moshe Rock et al.

It is certified that error appears in the above-identified patent and that said Letters Patent is hereby corrected as shown below:

Column 9, line 18, Claim 61:

After "surface" insert --of--

Column 13, line 64, Claim 61:

After "garment" insert --system--

Column 14, line 1, Claim 62:

After "garment" insert --system--

Column 14, line 5, Claim 63:

After "garment" insert --system--

Column 14, line 6, Claim 63:

Delete "60" and insert --claim 60--

Column 14, line 9, Claim 64:

After "garment" insert --system--

Column 14, line 11, Claim 65:

After "garment" insert --system--

Column 14, line 27, Claim 66:

Delete "out pile" and insert --outer pile--

Signed and Sealed this
Twenty-third Day of October, 2012

David J. Kappos

David J. Kappos
*Director of the United States Patent and Trademark Office*

Column 14, line 34, Claim 68:

Before “outer” delete “pile”

Column 16, line 37, Claim 85:

After “forming” insert --hybrid--

Column 16, line 51, Claim 88:

Delete “haying” and insert --having--

Column 18, line 11, Claim 97:

Delete “haying” and insert --having--